United States Patent [19]

Tomaru

[11] Patent Number: 5,531,317
[45] Date of Patent: Jul. 2, 1996

[54] TILT-TYPE STEERING COLUMN DEVICE

[75] Inventor: Masaki Tomaru, Shibukawa, Japan

[73] Assignee: NSK Ltd., Tokyo, Japan

[21] Appl. No.: 480,408

[22] Filed: Jun. 7, 1995

[30] Foreign Application Priority Data

Jul. 4, 1994 [JP] Japan ..................................... 6-173143

[51] Int. Cl.⁶ ................................................... B62D 1/18
[52] U.S. Cl. .............................................. 280/775; 74/493
[58] Field of Search ................................ 280/775; 74/493

[56] References Cited

U.S. PATENT DOCUMENTS 5,338,064  8/1994  Sadakata et al. ......................... 280/775

FOREIGN PATENT DOCUMENTS 59-43163  12/1984  Japan .
62-18121  5/1987  Japan .
H435259  8/1992  Japan .

Primary Examiner—Kenneth R. Rice
Attorney, Agent, or Firm—Helfgott & Karas

[57] ABSTRACT

A tilt type steering column device comprises a stationary bracket 7 having a protrusion 8 on one side thereof, a tilt lever 11 provided on the one side of the stationary bracket, a tilt bolt 9 extending through the stationary bracket 7, a rotating plate 6 provided between the stationary bracket 7 and the tilt lever 11 so as to rotate around the tilt bolt 9 and having stepped-portions on an outer periphery, and a biasing spring 5 engaged with the tilt lever 11 and the rotating plate 6 to bias the rotating plate 6, so that one of the stepped portions is engaged with the protrusion 8, thereby preventing the steering column from erroneously moving upon impact.

5 Claims, 7 Drawing Sheets

TILT-TYPE STEERING COLUMN DEVICE

DETAILED DESCRIPTION OF THE INVENTION

This invention is related to a steering column device of the tilt-type which is used for adjusting the height position of a steering wheel of an automobile.

DESCRIPTION OF THE RELATED ART

In order to change the height of the steering wheel to match the physique and driving posture of the driver, adjustment devices for adjusting the height of the steering wheel have been proposed prior to this invention, and disclosed, for example, in Japanese Utility Model Publication KOKOKU No. S62-18121. These adjustment devices are called tilt-type steering column devices.

One of the tilt-type steering column devices proposed prior to this invention is constructed as shown, for example, in FIG. 1.

This steering column device is used with a steering wheel 1 and a rotating steering shaft 2 extending from the steering wheel 1, and comprised of a steering column 3 through which the rotating steering shaft 2 extends, and an intermediate shaft 26 to which the rotating steering shaft 2 is connected, so that the rotating steering shaft 2 is associated with a steering gear 27.

The rotating steering shaft 2 can be turned by turning the steering wheel 1 which is fastened to the top or rear end of the rotating steering shaft 2.

The bottom or front end portion of the steering column 3 is supported by the vehicle body, so that the steering column 3 can be tilted freely around a lateral shaft 4, while the top or rear end portion of the steering column 3 is supported by the vehicle body, so that the top or rear end portion of the steering column 3 can be freely adjusted up or down. Specifically, a stationary bracket 7 is fastened to the vehicle body underneath the dashboard (partly defined by the curved line 25 in FIG. 1). In other words, the steering column 3 is rotated for tilting around the lateral shaft 4 connected to the bottom or front end portion of the steering column 3, and the rotating or tilting of the steering column 3 is controlled at its top or rear end portion by a long arc-shaped hole or slot 22 which is formed in the stationary bracket 7 in the up and down direction. It will be noted that the lateral shaft 4 mentioned above is located at the center of the circle along which the slot 22 extends, and that the lateral shaft 4 operates as a support point when the steering column 3 is tilted.

A tiltable bracket 24 is comprised of a pair of sufficiently rigid metal plates which are bent and welded or fastened by some other means to the top or rear end portion of the steering column 3, so that the tiltable bracket 24 is held by the stationary bracket 7 (See FIG. 3 and 4). The pair of rigid metal plates for the tiltable bracket 24 have a hole 23, respectively.

The pair of rigid metal plates may be formed separately as shown in FIG. 3, or by a single plate of the substantially channel shape as shown in FIG. 4.

A single tilt bolt 9 having a head 21 is inserted through the circular holes 23 formed in this tiltable bracket 24 and through the arc-shaped slot 22 of the stationary bracket 7. The diameter of the head 21 of this tilt bolt 9 (see FIGS. 2 thru 4) is sufficiently larger than the width of the slot 22 so that the head 21 can not pass through the slot 22. Moreover, the head 21 is engaged with the slot 22 such that it cannot turn with respect to the slot 22, but can only move up and down freely.

A tilt nut 10 is screwed on the thread end portion of the this tilt bolt 9 (see FIGS. 2 thru 4), so that it can be freely tightened or loosened by rotating the tilt nut 10 per se or by using a tilt lever 11 (FIG. 4).

To adjust the height position of the steering wheel 1, the tilt bolt 9 is moved along the slot 22 in the stationary bracket 7 with the tilt nut 10 loosened, and then the tilt lever 11 is used, so that the tilt nut 10 is tightened on the tilt bolt 9.

For example, if the tilt bolt 9 is moved to the top end of the slot 22 and then the tilt nut 10 is tightened, the steering wheel 1 is raised to the position as shown by the solid line in FIG. 1, and if the tilt bolt 9 is moved to the bottom end of the slot 22 and then the tilt nut 10 is tightened, the steering wheel 1 is lowered to the position shown by the dotted line in the same figure.

In order that the height of the steering wheel 1 is not moved unexpectedly when adjusting the height position of the steering wheel 1, a device as disclosed in Japanese Utility Model Publication KOKOKU No. S59-43163 was proposed, and its construction is shown in FIGS. 2 and 3.

Here, a stationary gear 13 is secured by screws to the outer surface of one of the two vertical plate portions 12 that make up the stationary bracket 7.

There is a locking plate 14 located between this stationary gear 13 and the tilt nut 10 screwed on the end portion of the tilt bolt 9. Movable teeth 17 are integrally formed on the inside surface of this locking plate 14, while stationary teeth 16 are formed on the outside surface of the stationary gear 13, so that the stationary teeth 16 are engaged with the movable teeth 17. A compression spring 15 is located between the tilt nut 10 and the locking plate 14 so as to elastically press this locking plate 14 against the stationary gear 13.

By moving the tilt nut 10 to the left in FIG. 3 to secure the height position of the steering wheel 1, the locking plate 14 is unable to move to the right of the same figure. As a result, the locking plate 14 is unable to move up or down due to the engagement of the movable teeth 17 with the stationary teeth 16. Consequently, the tilt bolt 9 that is inserted through the locking plate 14 is unable to move up or down, and thus the height position of the steering wheel (not shown in FIG. 3) cannot change unexpectedly.

On the other hand, the construction of a device as shown in FIG. 4 is disclosed in Japanese Utility Model First Publication KOKAI No. S63-32963. Here, a locking piece 18 is placed between the tilt nut 10 and the stationary bracket 7, and movable teeth 17 are formed on this locking piece 18, while stationary teeth 16 are formed on the outside of the stationary bracket 7, so that the movable teeth 17 can be engaged with and disengaged from the stationary teeth 16. There are protruding sections 19 on both the top and bottom portions of the inside of the locking piece 18, and these protruding sections 19 are engaged with the slot 22 to prevent the locking piece 18 from turning.

A tilt bolt 9 is inserted through the locking piece 18 and a tiltable bracket 24.

Also, there is a compression spring 20 placed between the outside surface of the tiltable bracket 24 and the locking piece 18. This compression spring 20 applies an elastic force on the locking piece 18 in a direction to disengage the movable teeth 17 from the stationary teeth 16.

By moving the tilt nut 10 to the right in FIG. 4 to secure the height position of the steering wheel (not shown in FIG.

4), the locking piece 18 is unable to move to the left in the same figure. As a result, the locking piece 18 is unable to move up or down due to the engagement between the stationary teeth 16 and the movable teeth 17. Consequently, the tilt bolt 9 that is inserted through the locking piece 18 is unable to move up or down, and thus the height position of the steering wheel cannot change unexpectedly.

In recent years, safety regulations for vehicle impact have become very strict, and even for the tilt-type steering column devices, there is a demand for construction that regulates the motion of the tilt-type steering column device in order that the energy of impact is sufficiently absorbed, and that unanticipated contact with the passengers is avoided. Specifically, such as construction that prevents the height of the steering wheel from being changed unexpectedly during impact is required.

The prior steering column devices of the tilt-type as in FIGS. 3 and 4 are constructed so that the height position of the steering wheel is not changed unexpectedly. However, these devices require many parts, as described above, and there are many problems related to processing and assembly making the cost very expensive.

SUMMARY OF THE INVENTION

One objective of this invention is to provide a steering column device of the tilt-type that is constructed with smaller numbers of parts in a simple structure while it prevents the height position of the steering column from being changed unexpectedly during impact.

Another objective of the present invention is to provide a simple method of assembling such a tilt-type steering column device.

The tilt-type steering column device of this invention for use in combination with a steering shaft to which the steering wheel is attached, comprises a steering column with a front end and middle portions through which the steering shaft is rotatably inserted, a lateral shaft to which the front end portion of the steering column is hinged so that the steering column freely tilts around the lateral shaft, a tiltable bracket secured in the middle portion of the steering column and having through-holes provided in the tiltable bracket, a stationary bracket having a pair of vertical plate portions and fastened to the vehicle so as to hold the tiltable bracket on the right and left side thereof, the slots of the vertical plate portions formed in the up and down direction in alignment with the through-holes of the tiltable bracket, a rod having a base portion and an end portion and inserted through the slots in the vertical plate portions and the through-holes in the tiltable bracket, the base portion having a diameter large enough that it cannot pass through the slots, a pressure member mounted axially movably to the end portion of the rod which protrudes from the slots, and shaped so as not to pass through the slots, a control member for moving this pressure member in the axial direction with respect to the rod, a rotating plate having a peripheral portion formed with stepped portions and placed between the control member and one of the vertical plates, so that the rotating plate is rotated around the rod member, the one of the vertical plates having a protrusion, and a spring member connected to the control member and to the rotating plate so as to force one of the stepped portions of the rotating plate toward the protrusion on the vertical plate.

DESCRIPTION OF THE PREFERRED EMBODIMENTS

Figure 1:
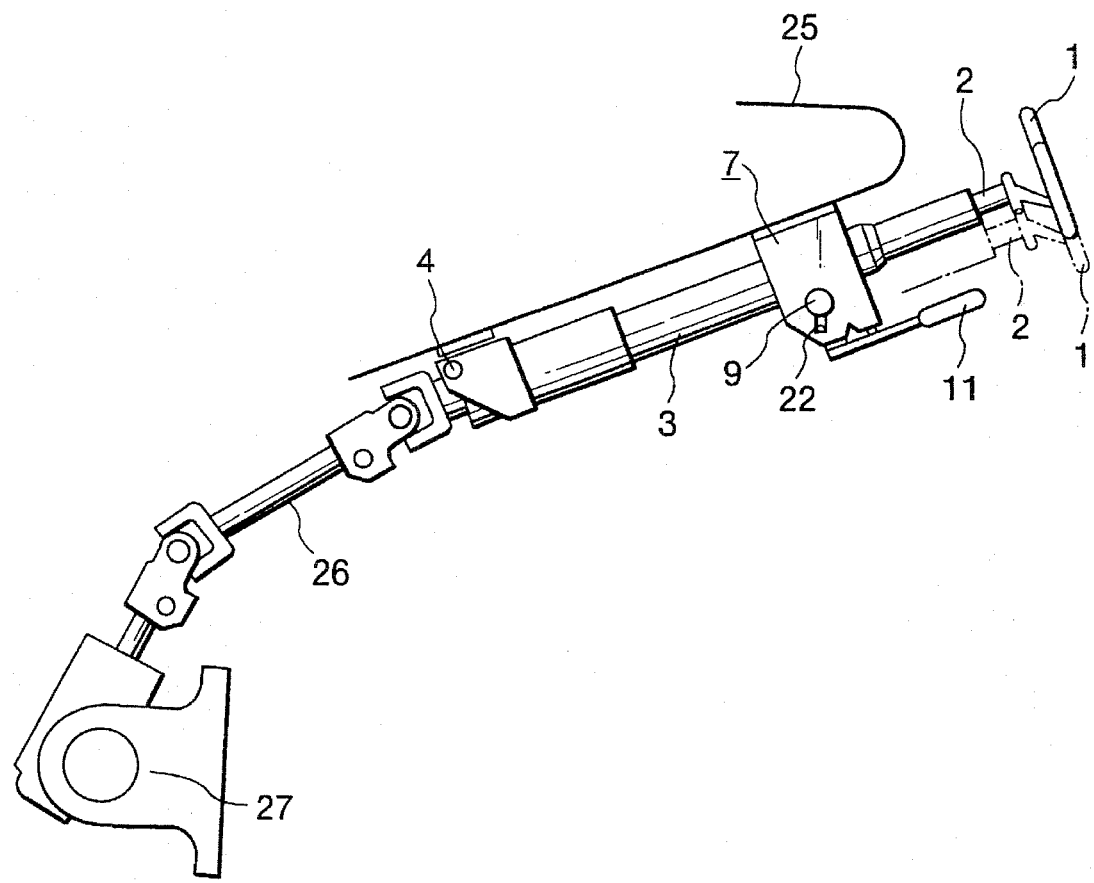
FIG. 1 is a side elevational view to show the overall construction of a prior art tilt-type steering column device to which this invention is applied.
Figure 2:
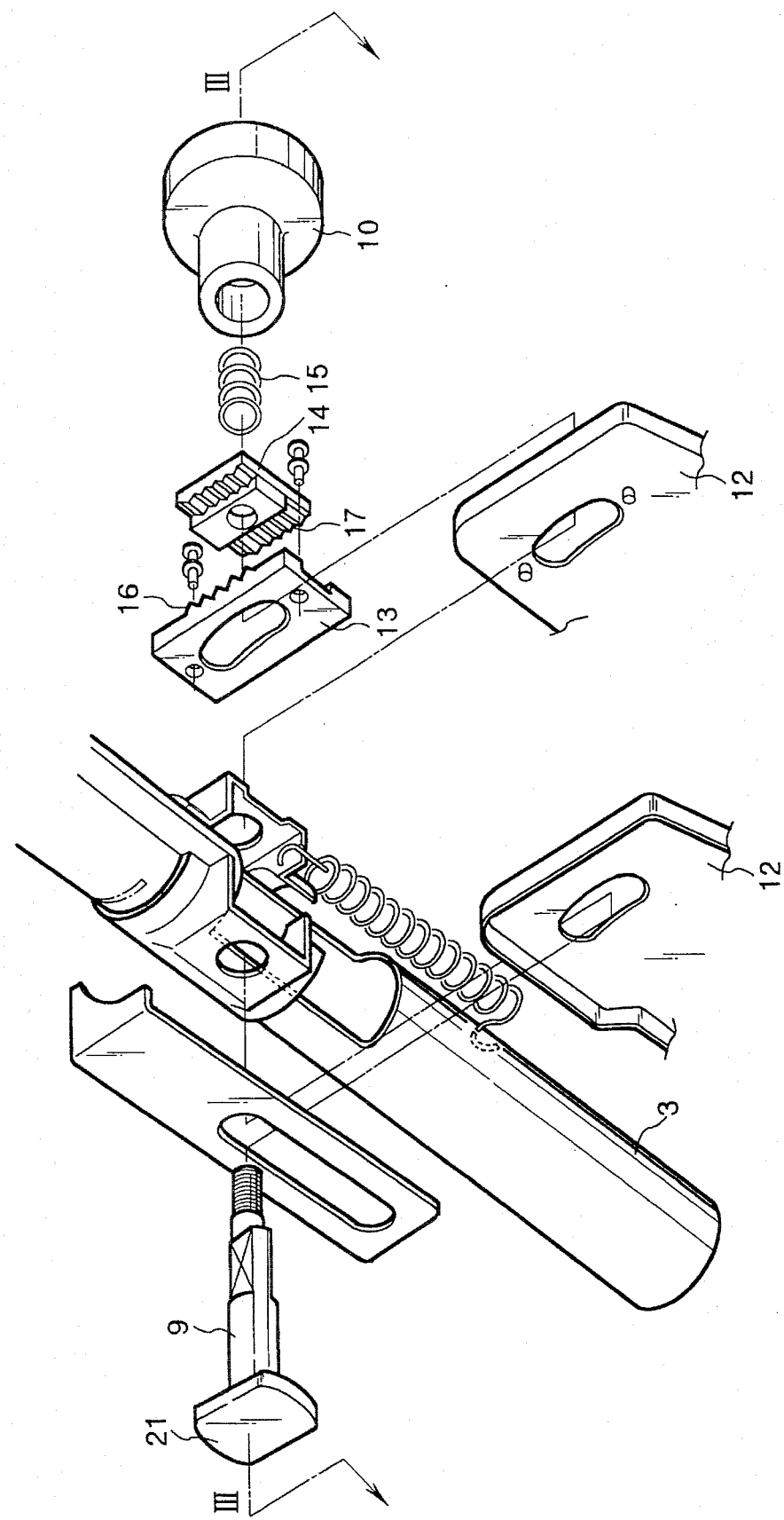
FIG. 2 is a pictorial exploded perspective view of the main parts of a first example of the prior art construction.
Figure 3:
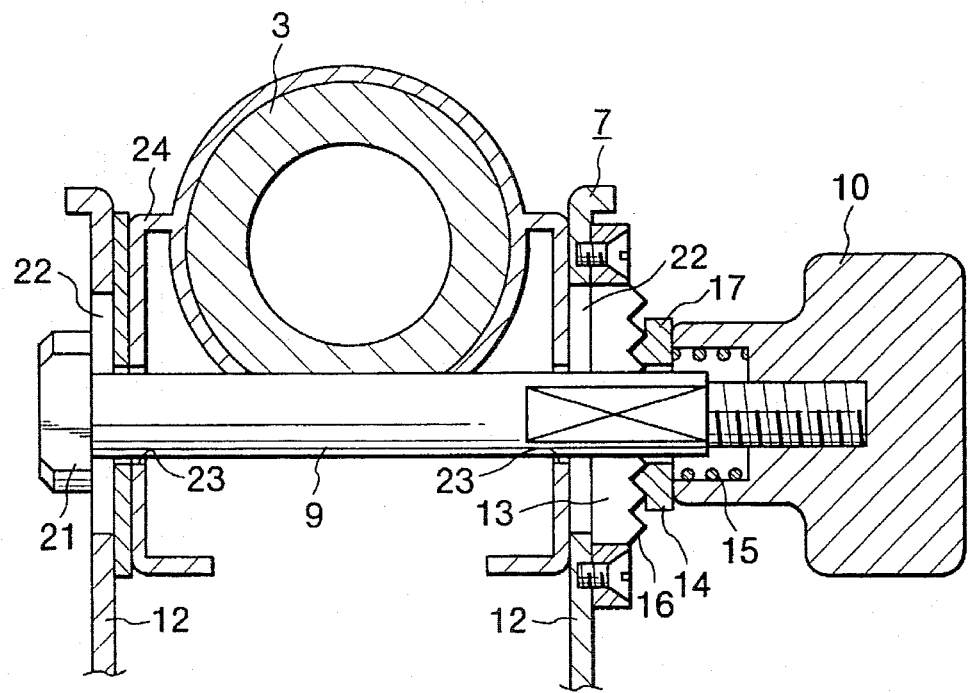
FIG. 3 is a cross-sectional view taken along the line of III—III showing assembly of the first embodiment of FIG. 2.
Figure 4:
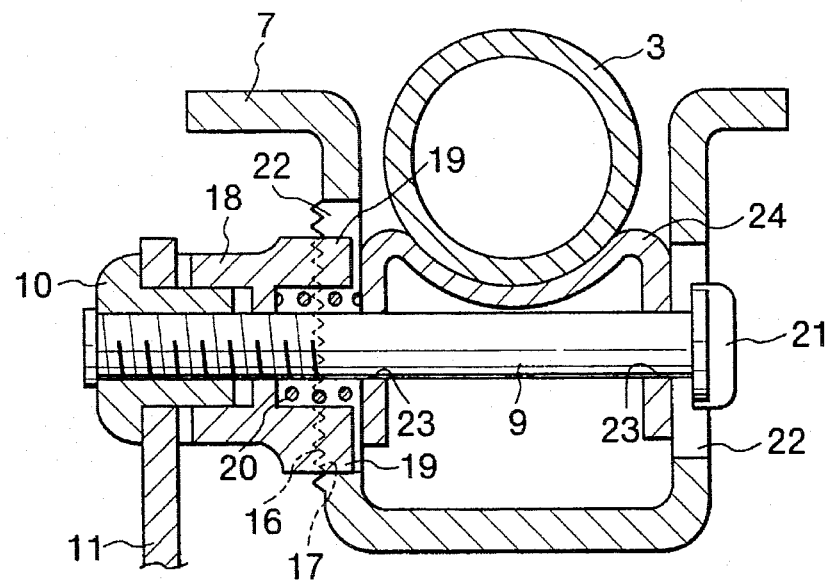
FIG. 4 is a cross-section view of a second example of the prior art construction.
Figure 5:
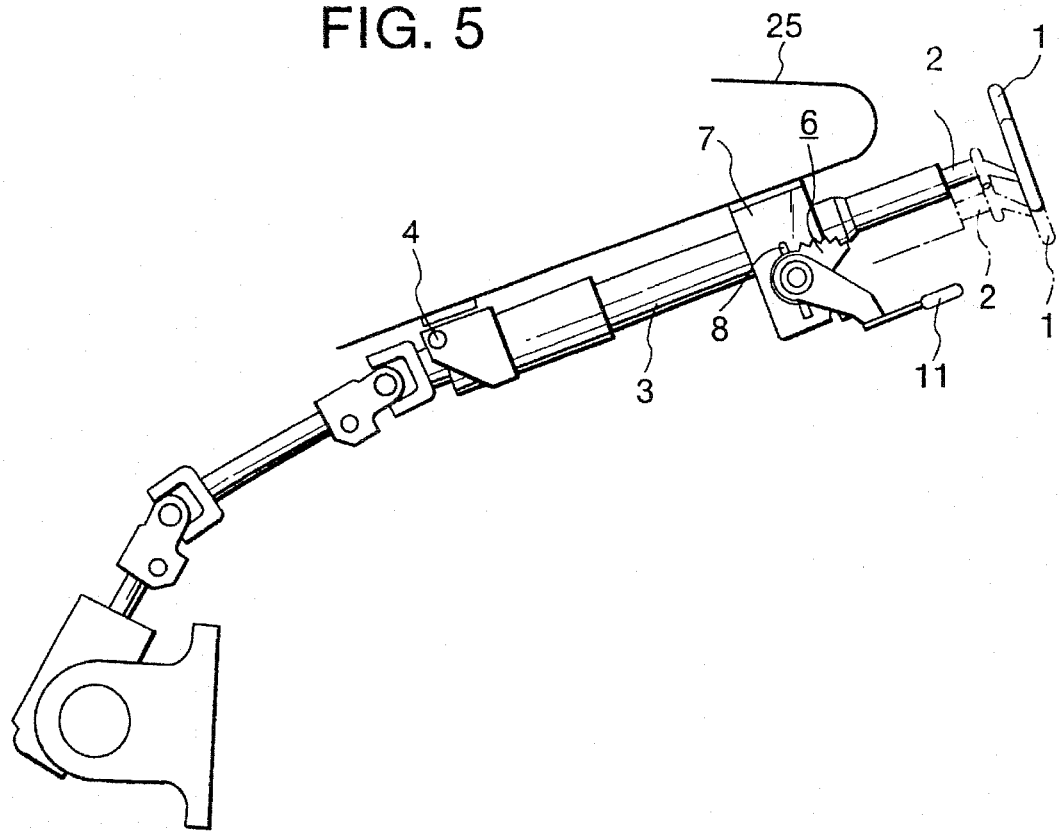
FIG. 5 is an overall view of a first embodiment of this invention.

FIG. 5 thru 9 show a first embodiment of this invention.

The tilt-type steering column device of this invention is applied to a steering apparatus comprising a steering wheel 1, a steering shaft 2 extending from the steering wheel 1, and a steering column 3 into which the steering shaft 2 is inserted.

The steering column 3 is supported by a stationary bracket 7 having a pair of vertical plate portions, a tiltable bracket 24 having a pair of plate portions between the vertical plate portions of the stationary bracket 7, and a tilt bolt or rod 9 extending through the stationary bracket 7 and the tiltable bracket 24 and into a tilt nut or pressure member 10 through threaded engagement.

There is a protrusion 8 provided on an outer surface of the stationary bracket 7 to work as a stopper member as mentioned later.

The steering shaft 2 can be turned by turning the steering wheel 1 attached to the top of the steering shaft 2, and the bottom end of the steering column 3 is supported by the vehicle body so that the steering column 3 can be rotated for tilting freely around a lateral shaft 4, and the upper end of this steering column 3 is supported by the vehicle body so as to be adjusted freely up and down, in the same way as the prior art device shown in FIG. 1.

The tilt-type steering column device of this invention, constructed as described above, functions substantially in the same manner as the previous tilt-type steering column devices for adjusting the height position of the steering wheel e.g. to match the physique of the driver.

It will be noted in the present invention that there is a rotating plate 6 of a sector shape which has stepped portions along its outer periphery.

The steering wheel 1 is inclined to be displaced against the locking force of the tilt mechanism portion due to the impact force on the steering column wheel e.g. upon corrosion. However, in the case of the tilt-type steering column device of this invention, one of the stepped portions 6a, 6b, 6c... of the rotating plate 6 comes in direct contact with the protrusion 8 formed on the outer surface of the stationary bracket 7 to make it possible to prevent the steering wheel from being moved in the tilt-up or tilt-down direction by the impact force against the clamp force of the tilt mechanism portion.

Figure 6:
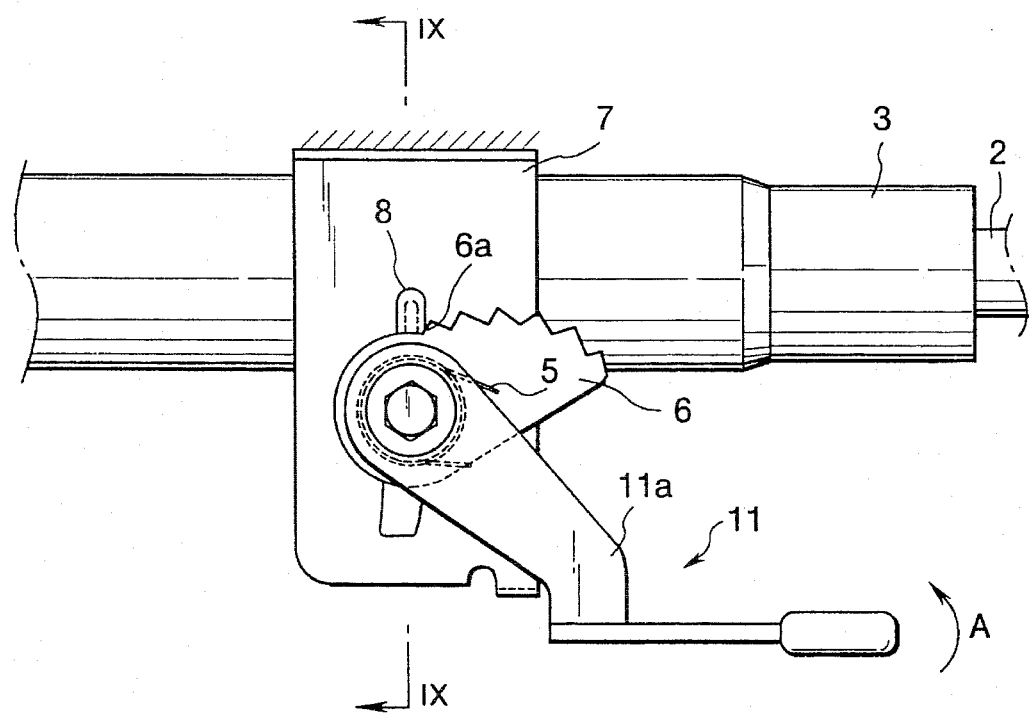
FIG. 6 is a side elevational view to show the first embodiment of this invention in the tilt-up position.

As shown in FIG. 6, if the control or operating member, specifically lever 11 is turned in the tightening direction (counterclockwise in FIG. 6), when the steering column 3 is tilted to the upper tilt position, the rotating plate 6 for stopper is turned or rotated in the same direction (see the arrow A in FIG. 6) by a biasing spring member 5, so that the protrusion 8 formed on the outer surface of the stationary bracket 7 comes in contact with an upright edge of a stepped portion 6a of the rotating plate 6. If the lever 11 is turned further, so that pressure is applied to the spring 6, the lever operation is stopped at the position where the protrusion 8 and the upright edge of the stepped portion 6a come in contact to each other under pressure.

Figure 9:
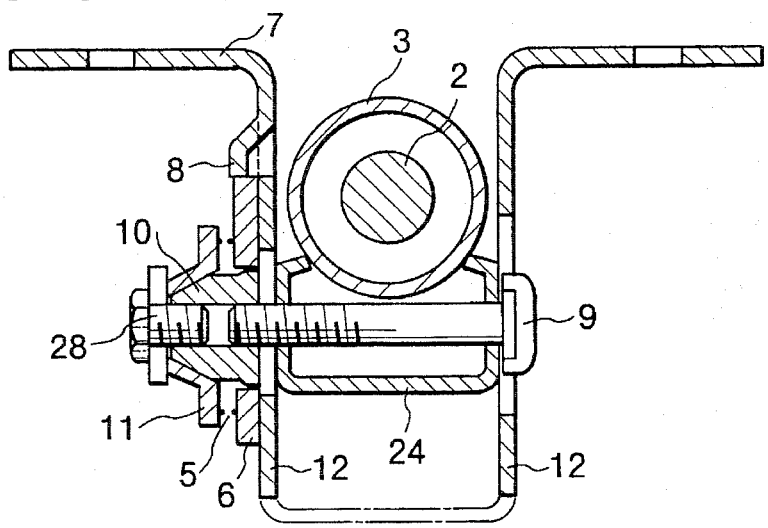
FIG. 9 is a cross-sectional view taken along the line IX—IX of the first embodiment in FIG. 6.

It will be noted in FIG. 9 that the lever or control member 11, tilt nut or pressure member 10 and tilt bolt 9 form a clamp device, and that although the lever or control member 11 and the rotating plate 6 are moved in the same direction as mentioned above, the spring 5 provides angular adjustment between them.

It is possible to use a coil spring or plate spring as the spring 5.

The rotating plate 6 is thus prevented from moving freely, and the displacement of the steering column 3 is also securely prevented.

Figure 7:
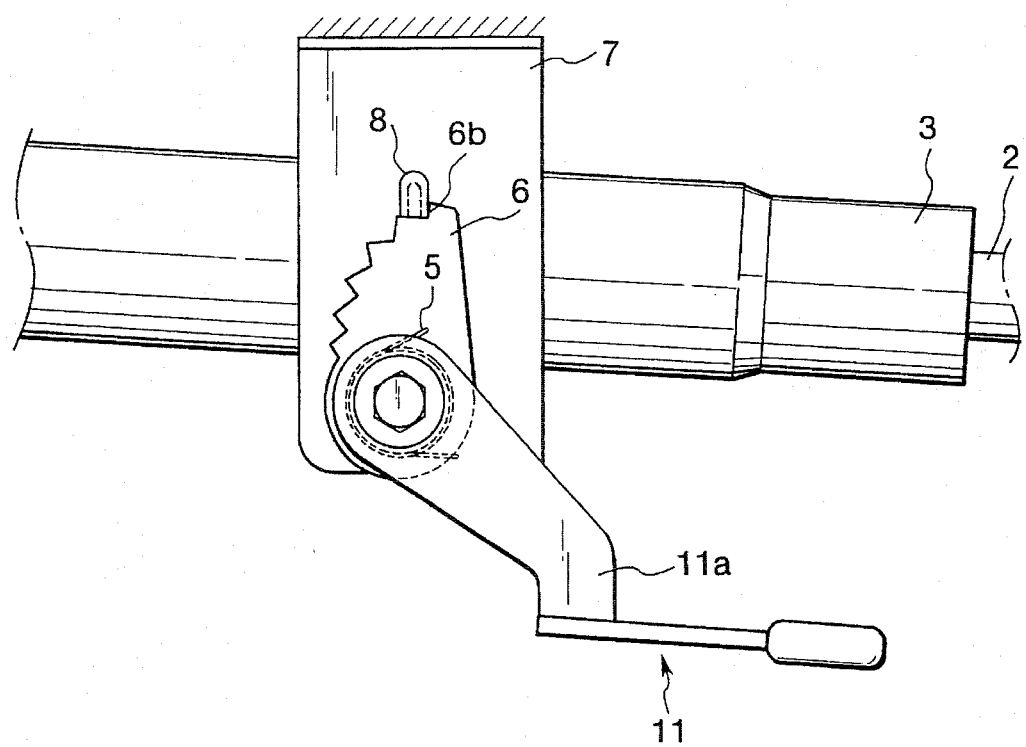
FIG. 7 is a side elevational view to show the first embodiment of this invention in the tilt-down position.

FIG. 7 shows the steering column 3 in the tilted down position, and here the protrusion 8 comes into contact with and presses against the upright edge of another stepped portion 6b of the rotating plate 6.

In this tilted position, since the upright edge of the stepped portion 6b of the rotating plate 6 comes in contact with the protrusion 8, when an impact force is applied to the steering column 3 forcing to the tilt-up direction, the protrusion 8 receives that force by way of the rotating plate 6, and the force is finally received by the vehicle body through the stationary bracket 7.

This is done in the same manner in any tilt position.

Figure 8:
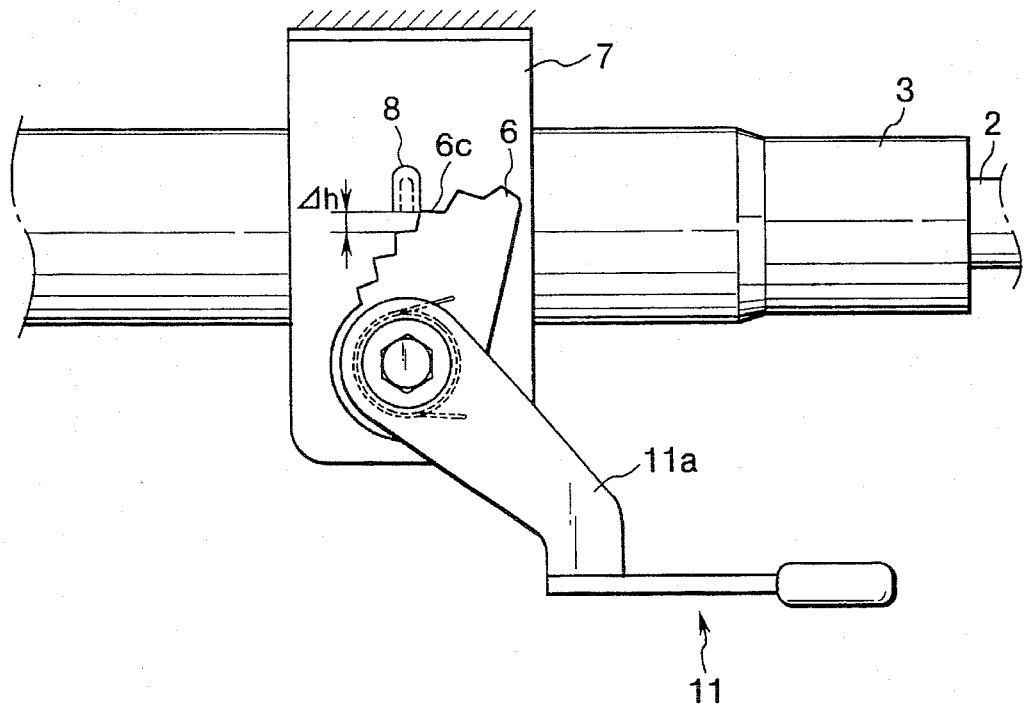
FIG. 8 is a side elevational view to show the first embodiment of this invention in the middle position.

As shown in FIG. 8, there is a small clearance "Δh" between the lateral edge of another stepped portion 6c of the rotating plate 6 and the protrusion 8. However, this clearance is small enough that even if there is shifting of the steering column 3 in this area, it does not obstruct the column device in the present invention from accomplishing its objective.

As shown in FIG. 9, it will be noted that the rotating plate 6 can rotate around the tilt bolt or rod 9 and tilt nut or pressure member 10, and that a force in the tilt up direction is transferred from the tilt nut or pressure member 10 to the rotating plate 6. The function after the force is transferred to the rotating plate 6 is substantially explained with reference, to FIG. 7. Specifically, the force is received by the protrusion 8.

Incidentally, the tilt nut or pressure member 10 is integrally connected to the lever or control member 11 by another bolt 28, which is extended into the tilt nut or pressure member 10 and opposed to the tilt bolt 9. This arrangement makes it possible to adjust the angular position of the lever 11.

Figure 10:
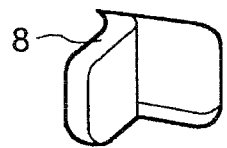
FIG. 10 is a perspective view to show a method for making the protrusion of the first embodiment.

FIG. 10 shows another processing method for forming the protrusion 8 on the stationary bracket 7 using a bending method. This is different from the processing method of FIG. 9 which uses a press. It is also possible to weld a small piece on the stationary bracket 7 to make the protrusion 8.

In order to hold the torsion coil spring member 5 in place, holes can be made in the rotating plate 6 and the base portion 11a of the tilt lever 11 as shown in FIGS. 6 and 7, so that the ends of the coil spring member 5 can be bent and inserted into the holes for fastening. In another way, it is also possible, as shown in FIGS. 11 and 12, to wrap the coil spring member 5 around the rotating plate 6 and the base portion 11a of the tilt lever 11 without making holes in them.

Figure 11:
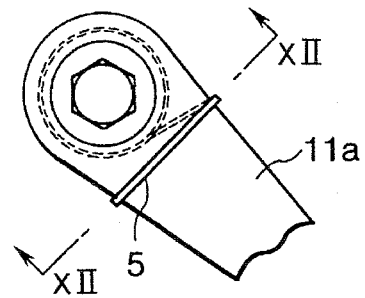
FIG. 11 is a plan view to show a method for securing the torsion coil spring of the first embodiment.
Figure 12:
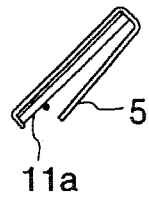
FIG. 12 is a cross-sectional taken along the line XII—XII of FIG. 11.

In FIG. 11 the spring member 5 is wrapped around the base portion 11a of the tilt lever 11. It is also possible to wrap it around the rotating plate 6 in the same way.

In this first embodiment of the invention, the construction is such that it receives a force upon impact and prevents the steering column 3 from being shifted toward the tilt-up side due to the force.

Figure 13:
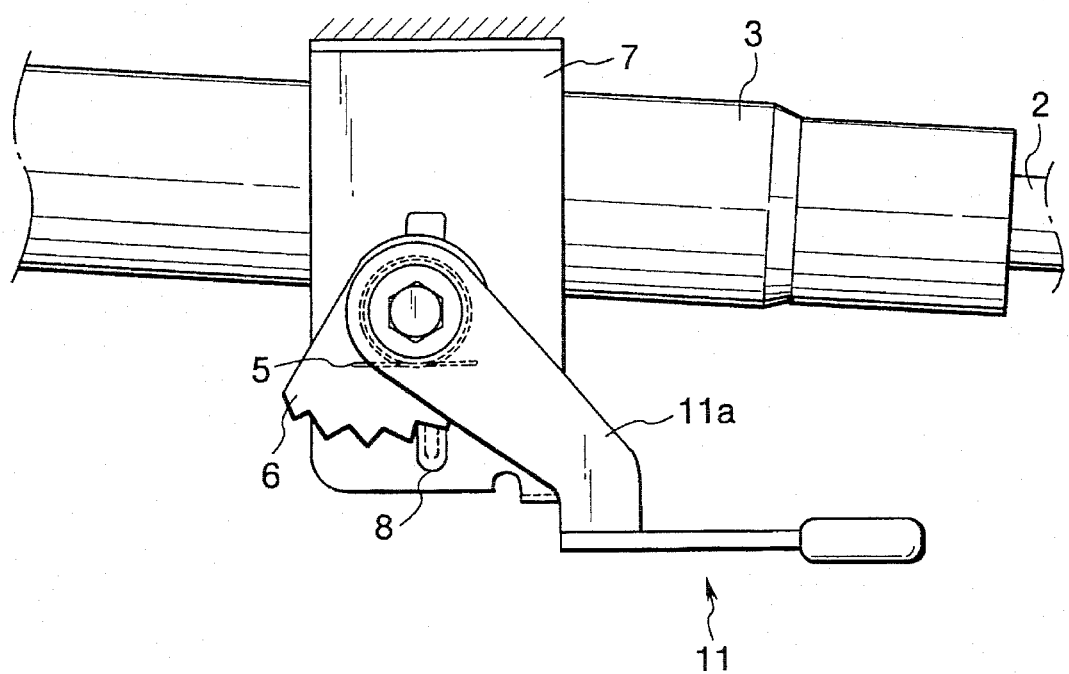
FIG. 13 is an enlarged view of the main part of a second embodiment of this invention.

In FIG. 13, a second embodiment of the invention is given where the construction is such that it prevents the steering column 3 from being shifted in the tilt-down side.

The operation of the invention is substantially the same as in the first embodiment, except that the direction of force is opposite.

Figure 14:
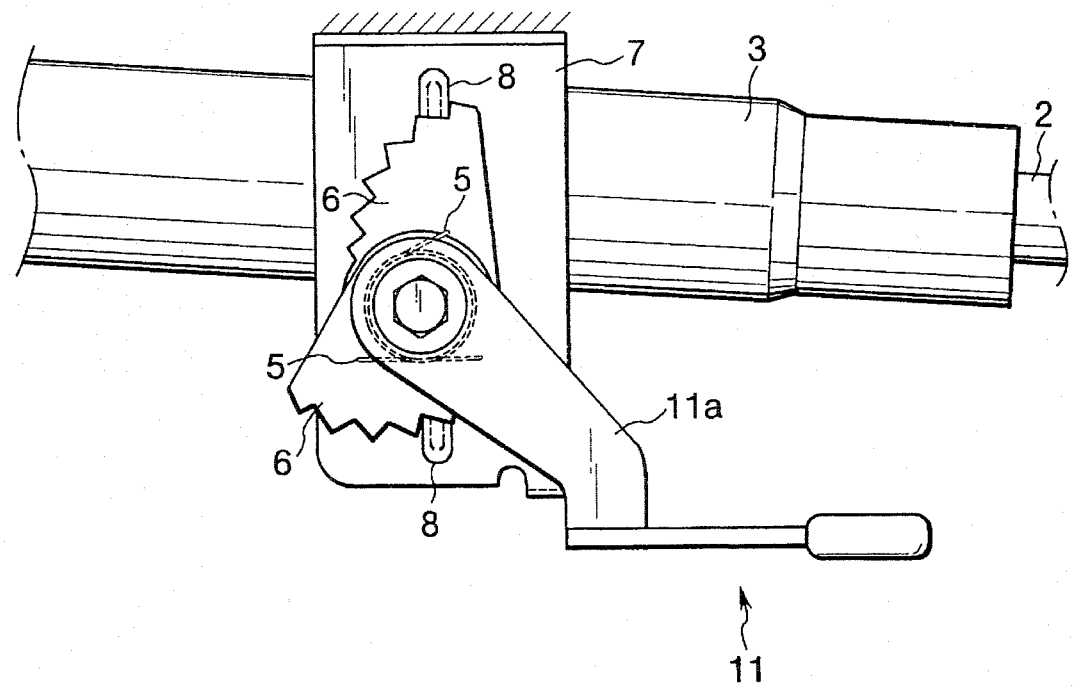
FIG. 14 is an enlarge view of the main part of a third embodiment of this invention.

Moreover, FIG. 14 shows construction that prevents the steering column from being shifted in both the tilt-up and tilt-down directions. This is a combination of the first and second embodiments.

The tilt-type steering column device of this invention is constructed and functions as described above, and the construction for preventing unexpected or erroneous changes in the height position of the steering wheel is simple and specifically comprises only two main parts.

Therefore, reliable operation can be expected, and easy assembly and low cost are possible because of the reduction in the number of parts.

Therefore, it is possible to provide a safe tilt-type steering column at low cost.

In the embodiments mentioned above, a protrusion and rotating plate are provided on one side of the stationary bracket, but another set of protrusion and rotating plate can be provided on the other side of the stationary bracket.

What is claimed is:

1. A tilt-type steering column device for use in a steering apparatus having a steering shaft and a steering wheel attached to the steering shaft, comprising:

a steering column with front and rear ends through which the steering shaft is rotatably inserted, a lateral shaft to which the front end of the steering column is hinged so as to freely rock around the lateral shaft, a tiltable bracket secured between the front and rear ends of the steering column and having through-holes, a stationary bracket having a pair of vertical plate portions so as to hold the tiltable bracket therebetween, the vertical plate portions each having a slot in an up and down direction in alignment with the through-holes in the tiltable bracket, and one of the vertical plates having an outer surface formed with at least one protrusion, a rod inserted through the slots in the stationary bracket and through the through-holes in the tiltable bracket and having a base portion sized large enough so as not to pass through the slots, and an end portion projecting from the one of the vertical plates, a pressure member provided around the rod so as to be axially movably engaged with the end portion of the rod, and shaped so as not to pass through the slots, a control member for pressing the pressure member in the axial direction with respect to the rod, a rotating plate having an outer peripheral portion formed with stepped portions and placed around the pressure member between the control member and one of the vertical plates so as to rotate around the rod member, and a spring member connected to the control member and the rotating plate to force the rotating plate, so that one of the stepped portions of the rotating plate is engaged with the protrusion as the rotating plate is rotated.

2. The tilt-type steering column device of claim 1, wherein the protrusion is formed above the rotating place to receive an upward force upon impact to the steering wheel.

3. The tilt-type steering column device of claim 1, wherein the protrusion is formed below the rotating plate to receive a downward force upon impact to the steering wheel.

4. The tilt-type steering column device of claim 1, wherein the outer surface of the vertical plate is formed with first and second protrusions, such that the first protrusion is formed above the rotating place to receive an upward force upon impact to the steering wheel, while the second protrusion is formed below the rotating plate to receive a downward force upon impact to the steering wheel.

5. A steering column device for use in a steering apparatus of tilt type having a steering wheel and a steering shaft, comprising:

a steering column through which the steering shaft extends, a stationary bracket having a pair of vertical plate portions which have a slot with a width, a tiltable bracket mounted to the steering column and having a pair of plate portions provided between the pair of vertical plate portions of the stationary bracket and each having a hole, a pressure member sized larger than the width of the slot of the stationary bracket, provided adjacent to one of the vertical plate portions and having a threaded hole extended therethrough, a rotating plate provided around the pressure member so as to rotate about the pressure member, and having an outer peripheral portion formed with stepped portions, a bolt extending through the slots of the stationary bracket, through the holes of the tiltable bracket and into the threaded hole of the pressure member, and having a head sized larger than the width of the slot of the stationary bracket and a threaded end portion screwed into the threaded hole of the pressure member, and the head of the bolt engaged with the other of the vertical plate portions of the stationary bracket, a control member mounted to the pressure member so as to rotate the pressure member to tighten the bolt as the control member is rotated, a biasing spring provided between and connected to the rotating plate and the control member so as to force the rotating plate as the control member is rotated, and a stopper member provided on the one of the vertical plate portions of the stationary bracket so as to stop the rotating plate through engagement between the stopper member and one of the stepped portions of the rotating member.

* * * * *